United States Patent [19]
Kullmann et al.

[11] 3,728,463
[45] Apr. 17, 1973

[54] EXPANSION AND CONTRACTION COMPENSATION ARRANGEMENT FOR SUPERCONDUCTING CABLES

[75] Inventors: Dieter Kullmann; Fritz Schmidt, both of Erlangen, Germany

[73] Assignee: Siemens Aktiengesellschaft, Munich, Germany

[22] Filed: Mar. 3, 1972

[21] Appl. No.: 231,592

[30] Foreign Application Priority Data

Mar. 15, 1971 Germany..................P 21 12 406.1

[52] U.S. Cl...................174/12 R, 174/15 C, 174/19, 318/676
[51] Int. Cl...................H01v 11/02, H02g 15/02
[58] Field of Search..................174/9 R, 11 R, 11 BH, 174/12 R, 12 BH, 13, 15 R, 15 BH, 15 C, 16 BH, 18, 19, DIG. 6; 318/676

[56] References Cited

UNITED STATES PATENTS 3,539,702  11/1970  Edwards et al...............174/12 BH X

*Primary Examiner*—Laramie E. Askin
*Attorney*—Hugh A. Chapin

[57] ABSTRACT

A compensation arrangement for accommodating the contraction occurring in superconducting cables as they are cooled down to the operating temperature. The superconducting cable is of the type wherein the superconducting material is applied as a layer on coaxial carrier tubes of electrically normal-conducting material, and the carrier tubes are inserted into a protective tube. The cable is movably guided in the protective tube, and a cover plate is located at an end of the cable and adapted for carrying the current connections and the coolant feed lines to the cable. A corrugated tube is provided for connecting the cover plate with the protective tube. Also, the cover plate is movable relative to the protective tube by means of a servo control in such manner that the connections to the cable remain essentially free of mechanical stresses under the thermal movements that occur.

4 Claims, 1 Drawing Figure

PATENTED APR 17 1973  3,728,463
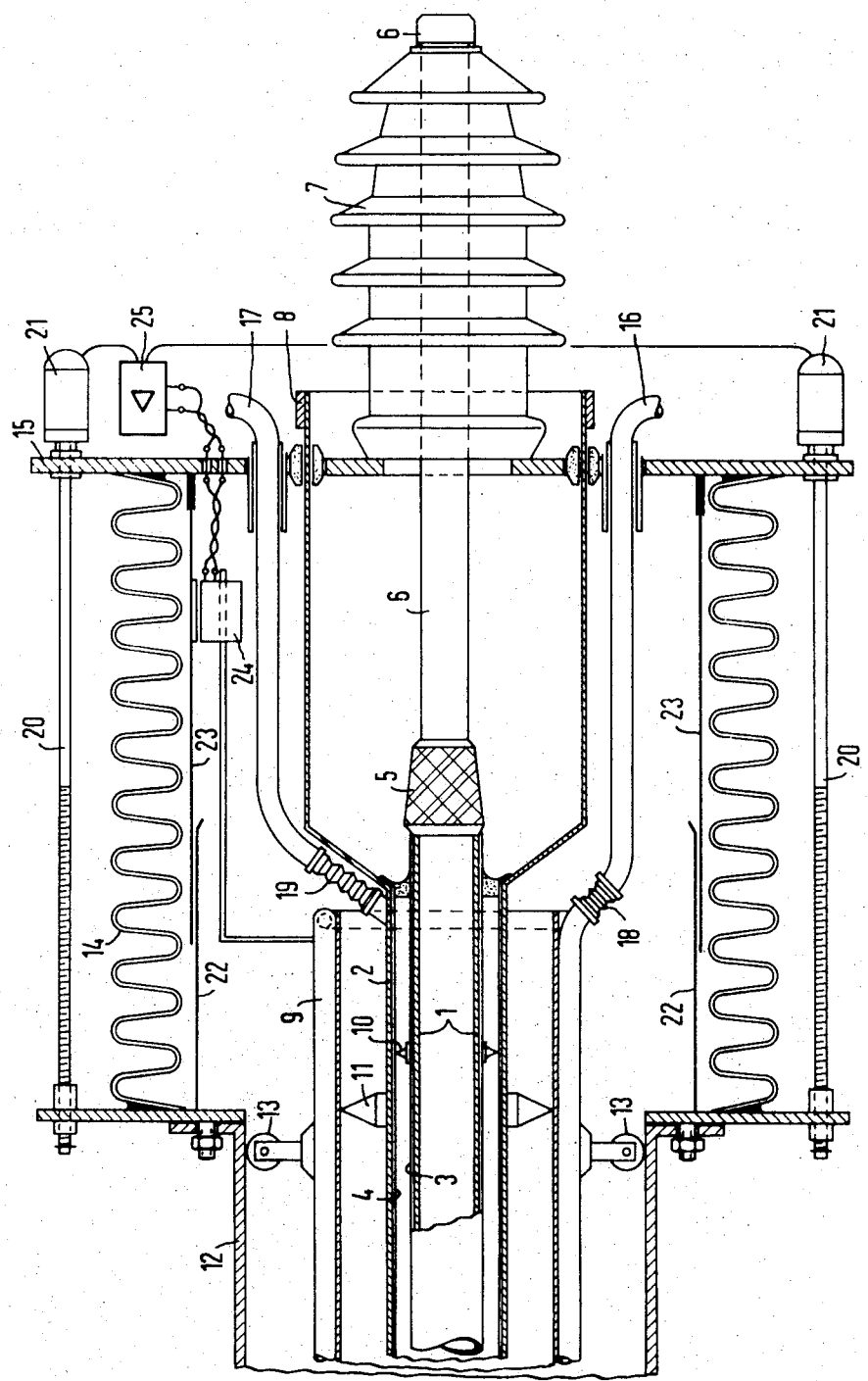

EXPANSION AND CONTRACTION COMPENSATION ARRANGEMENT FOR SUPERCONDUCTING CABLES

BACKGROUND OF THE INVENTION

1. Field of the Invention

The present invention relates to superconducting cables, and more particularly to a compensation arrangement for accommodating the contraction of the material used in such cables.

2. Description of the Prior Art

It is known in superconducting cables to apply the superconductor material to tubes of highly purified material, such as copper or aluminum, which at the operating temperature of the superconductor are electrically normal-conducting and have very high conductivity. This type of construction is also particularly suited for single or three-phase alternating-current cables, in which a concentric tube arrangement is used for each of the phases. The inner carrier tube serves as the outgoing conductor and the outer carrier tube as the return conductor, while the phases are linked outside of the cable proper. The electromagnetic field develops only between the inner and the outer conductor. The superconducting materials, operating at power line frequencies, which have been found most satisfactory are pure metals, such as niobium or lead, which exhibit very low hysteresis losses, provided the critical field strength $H_{cl}$ is not exceeded.

In alternating-current single and three-phase cables, the superconducting material is applied on the outside of the inner tube and on the outside of the outer tube, in order to avoid eddy current losses in the highly conductive copper or aluminum tubes. The electrical insulation between the outgoing and the return conductor is accomplished by a high vacuum or liquid helium held at supercritical pressure ($P > 2.26$ atmg), in order to avoid a two-phase flow which would lead to complications from a flow-technology point of view. In order to brace the two carrier tubes against each other, high-voltage resistant spacers are further required, the losses of which, however, are not important if their distance is sufficiently large. The two carrier tubes are furthermore arranged within a protective tube, which is evacuated for the purpose of thermal insulation.

When a superconducting cable of the design described above is put into operation, difficulties occur due to the contraction of the carrier tube material. When cooled from room temperature to the temperature of helium, the contraction or shrinkage is about 0.32 percent for copper and 0.42 percent for aluminum. For each 100 meters of cable length a shrinkage of 32 to 42 cm must therefore be expected when the cable is cooled down to the operating temperature.

SUMMARY OF THE INVENTION

It is an object of the invention to provide an expansion compensation arrangement for superconducting cables in which the superconducting material is applied as a layer on coaxial support or carrier tubes of normal-conducting material, and the support or carrier tubes, which can be enclosed concentrically within a radiation shield, are inserted into a protective tube. It is another object to provide a compensation arrangement which assures that the contraction which occurs in cooling the cable down to the operating temperature does not lead to problems with the conduction of the current, the feed lines for the cooling liquids or the vacuum connections.

These, and other objects, are achieved by the present invention which provides means for movably guiding the cable in the protective tube, and a cover plate located at an end of the cable, the cover plate carrying the current lead-in lines and the cooling liquid lines. The cover plate is connected with the protective tube via a corrugated tube encircling the current lead-in lines and the cooling liquid lines. Also, the cover plate is movable relative to the protective tube by means of a servo control in such a manner that the connections to the cable remain essentially free of mechanical stresses for the thermal movements that occur.

The servo control for moving the cover plate includes spindle drives with the electric positioning motors, which are controlled via distance measuring transducers in dependence on the thermal movement of the carrier tubes.

BRIEF DESCRIPTION OF THE DRAWING

The single FIGURE is a schematic of a compensation arrangement for a superconducting cable, illustrative of the present invention. The compensation arrangement is applied to the end of a superconducting cable of small to medium length, so that the corrugated tubes to be provided need not execute excessive movements. The cable may be either clamped at one end, or equipped with expansion compensation arrangements at both ends.

DESCRIPTION OF THE PREFERRED EMBODIMENT

Referring to the FIGURE, the electrically normal-conducting inner tube is indicated by the numeral 1, and the electrically normal-conducting outer tube indicated by the numeral 2. Superconducting layers 3 and 4, respectively, are applied to both tubes. Thus, the tubular inner conductor comprises the normal-conducting inner tube 1 and the superconducting layer 3, while the tubular outer conductor comprises the normal-conducting outer tube 2 and the superconducting layer 4. The inner tube 1 is connected via a connector 5 with the terminal 6 for the outgoing conductor, which is brought out through a high-voltage insulator 7. The connection to the return conductor is provided at 8. Around the two carrier tubes is arranged a radiation shield 9 which may, for example, consist of a copper pipe equipped with cooling coils for liquid nitrogen. The individual tubes are held concentrically against each other by spacers 10 and 11, respectively. The entire cable is guided movably in the protective tube 12, by means such as rollers 13. With the protective tube is connected, via a corrugated tubular body 14, a generally circular cover plate 15. The cover plate 15 carries the current terminals and the feed lines for the cooling liquids, these being indicated as feed line 16 for nitrogen, and feed line 17 for helium. The feed lines 16 and 17 are connected to the rigid cable via expansion joints 18 and 19, respectively.

The cover plate 15 is guided on spindles 20 relative to the outer protective tube 12, such spindles 20 being driven by positioning motors 21. So that the corrugated body 14 cannot turn to one side, telescoping guides 22, 23 are provided. The number of spindles is determined by design considerations. It is advisable to distribute them symmetrically over the circumference of the cover plate 15.

Between the cover plate 15 and the system cable proper, consisting of the conductors and the radiation shield, which is drawn into the outer protective tube 12 when the operating temperature is reached, there is provided a distance measuring transducer 24 of known design. Transducer 24 may be either an inductive distance transducer, a distance transducer with magnetoresistive plates ("field plates") or Hall-effect generators, or an elongation-measuring strip, which transmits an electric signal in case of relative motion. This signal is evaluated by a measuring amplifier 25 which actuates the positioning motors 21, so that the cover plate 15 together will all current and cooling-liquid connections follows the thermal movement of the cable practically without stress.

The invention makes it possible for the individual conductor sections to be rigidly connected with each other by, for example, electron-beam welding in a protective atmosphere.

For the purpose of compensation, it is preferable to use the carrier material of the superconductor as the basis for the measurement of the contraction. The smaller contraction of the radiation shield due to the higher temperature can be compensated for by the choice of a suitable material. However, it is conceivable to also provide the radiation shield itself with corrugated tubes in order to compensate for the thermal movements of such carrier tubes. Here, the total distance to be bridged by the corrugated bodies remains, of course, the same.

The invention can be applied to helium-insulated as well as to vacuum-insulated cables, since the tracking of the cover plate assures in any case the proper connection of all external operating means to the superconducting cable.

Similarly, the invention is applicable in the case of plastic-insulated cables. In both vacuum and plastic-insulated cables, the coaxial carrier tubes for the superconducting conductor material are additionally surrounded by a coolant pipe, through which coolant is carried along the outside of the outer carrier tube. Furthermore, coolant is also fed through the inner carrier tube.

Although the above description is directed to the preferred embodiment of the invention, it is noted that other variations and modifications will be apparent to those skilled in the art and, therefore, may be made without departing from the spirit and scope of the present disclosure.

What is claimed is:

1. Compensation arrangement for superconducting cables, wherein a superconducting material is applied as a layer on coaxial carrier tubes of electrically normal-conducting material, and the carrier tubes are inserted into a protective tube, comprising:
   means for movably guiding the cable in the protective tube;
   a cover plate located at an end of said cable, said cover plate carrying the current connections and the coolant feed lines to said cable;
   a corrugated tube connected between said cover plate and said protective tube, said corrugated tube encircling said current connections and said feed lines; and
   a servo control adapted for moving said cover plate relative to said protective tube, whereby the connections to said cable remain essentially free of mechanical stresses for the thermal movements that occur.

2. Compensation arrangement as recited in claim 1, wherein said servo control for moving said cover plate comprises spindle drives which are controlled by distance measuring transducers in dependence on the thermal movement of the carrier tubes.

3. Compensation arrangement as recited in claim 1, also comprising a tubular radiation shield arranged to encircle said coaxial carrier tubes.

4. Compensation arrangement as recited in claim 3, wherein said radiation shield comprises a corrugated body which compensates for the thermal movement of the carrier tubes.

* * * * *